United States Patent [19]

Kneller et al.

[11] 3,827,842
[45] Aug. 6, 1974

[54] DEVICE FOR COOLING EXTRUDED PLASTIC TUBING

[75] Inventors: Klaus Kneller, Nurensdorf; Jean Trüb, Grand-Lancy/Geneve; Jean Francois Grégoire, Aire/Geneve, all of Switzerland

[73] Assignee: Schweizerische Industrie-Gesellschaft, Neuhausen am Rheinfall, Switzerland

[22] Filed: Oct. 10, 1972

[21] Appl. No.: 296,087

[30] Foreign Application Priority Data
Oct. 13, 1971  Switzerland............. 14959/71

[52] U.S. Cl. ................................. 425/72
[51] Int. Cl. .................. B29d 23/00, B29c 25/00
[58] Field of Search ...................... 425/72

[56] References Cited
UNITED STATES PATENTS

| 2,770,009 | 11/1956 | Rogal et al. | 425/72 |
| 2,926,384 | 3/1960 | Hertz et al. | 425/72 |
| 3,176,347 | 4/1965 | Shaul | 425/72 |
| 3,507,006 | 4/1970 | Princen | 425/72 |
| 3,548,042 | 12/1970 | Hinrichs | 425/72 X |

*Primary Examiner*—Robert L. Spicer, Jr.
*Attorney, Agent, or Firm*—Karl F. Ross; Herbert Dubno

[57] ABSTRACT

A device for cooling extruded plastic tubing for mounting at the outlet end of an extrusion die and having a spiral (scroll-shaped) tank whose inlet communicates with a source of gaseous fluid such as air to be fed radially and uniformly onto the extruded tubing through an annular passage communicating with the spiral tank and extending coaxial with the axis of extrusion. The annular passage terminates in an annular slot forming the fluid outlet directed toward the axis of extrusion. At least two annular baffle plates are arranged in the annular passage for rendering uniform the flow of fluid.

2 Claims, 2 Drawing Figures

PATENTED AUG 6 1974 3,827,842

DEVICE FOR COOLING EXTRUDED PLASTIC TUBING

FIELD OF THE INVENTION

This invention relates to a device for cooling extruded plastic tubing for mounting at the outlet end of an extrusion die.

BACKGROUND OF THE INVENTION

For producing a tubular film of plastic material, a tubular parison is extruded by an extrusion die and then inflated at the outlet end thereof. In this manner tubing of plastic material is obtained which on leaving the extrusion die, is still in a molten state and must be cooled immediately afterwards.

The cooling means generally used for this purpose has the form of an annular chamber with a central opening through which the tubing to be cooled passes. The central opening of the annular chamber contains an annular slot through which cooling air is blown on to the tubing for cooling it as it traverses the central opening.

The tubing against which the cooling air is blown consists of plastic material which, as stated, is still in the molten state and therefore the air must be blown in a radial direction with respect to the axis of rotation of the annular chamber and the pressure of the air must be uniformly distributed over the entire circumference of the tubing. If either of these conditions is not met the produced tubing will be defective.

Various systems have already been proposed to achieve this result. One system provides that cooling air is fed to the annular chamber through four conduits opening at four points of the chamber which are angularly distributed around its central axis. Baffle plates in the form of cylinder rings are arranged concentrically with the axis of the central opening in the annular chamber between the four points at which the four conduits open and the annular outlet slot. However, in spite of these measures considerable differences in pressure still occur in the air which is distributed around and blown against the tubing so that the latter is deformed in an undesirable manner.

According to another proposed system an annular chamber is rotatably supported in the central opening of a cooling-air distribution box which tangentially communicates through an air supply conduit with a fan. The peripheral wall of the annular chamber is open to provide for communication between the annular chamber and the air-distribution box. The annular chamber is rotatively driven in the air distribution box by a motor with reduction gearing at a speed of about 1 r.p.m. In this manner the slight differences in the pressure of the cooling air blown against the tubing in the molten state move around the tubing as the latter passes through the central opening of the annular chamber.

However, this cooling device is relatively complex and expensive because of the rotatable mounting and rotation of the annular chamber. Further, it only produces a continuous change of the angular position of the differences in pressure around the tubing, but does not eliminate such differences in pressure.

SUMMARY OF THE INVENTION

It is therefore an object of the present invention to eliminate the disadvantages of the systems described above. This object is achieved according to the invention by providing a device for cooling extruded plastic tubing for mounting at the outlet of an extrusion die, which comprises a spiral (scroll-shaped tank having its inlet end connected to a source of gaseous fluid. This device is characterized in that an annular passage extending coaxially with the axis of the extrusion die communicates with the spiral tank and has an annular slot forming the fluid outlet directed toward the axis of extrusion, at least two annular baffle plates being arranged in the annular passage so as to form an obstacle in the flow of fluid from the spiral tank to the annular outlet slot.

BRIEF DESCRIPTION OF THE DRAWING

A preferred embodiment of the cooling device of the present invention is described below with reference to the accompanying drawing, in which:

FIG. 1 is a plan view of the device, and

FIG. 2 is a section taken along the line II—II of FIG. 1.

SPECIFIC DESCRIPTION

Referring to the drawing, the cooling device shown therein comprises a scroll-shaped gaseous fluid distribution tank 1 which is generally referred to herein as a "spiral tank" and in the illustrated embodiment contains a helical partition 2 which defines a helical passage in the interior of the tank. An air supply conduit 3 communicates tangentially with this helical passage, connecting it to a fan 4, diagrammatically shown in dot-dash lines.

The upper side of the distribution tank 1 is open and carries an annular chamber 5 having a diameter smaller than that of the tank and supported by the upper edge 1a of the inner wall of the tank 1. A cylinder ring 6a has one end welded to the upper edge 1b of the outer wall of the spiral tank 1 and the other end welded to the outer edge of an annular plate 6b having a central opening traversed by an outer cylindrical wall 10 of the chamber 5. A sealing ring 7 is arranged in the edge of the central opening of the annular plate 6b.

The chamber 5 has an annular base portion 8 welded to the edge 1a of the inner wall of the spiral tank 1. A cylinder ring 9 is concentrically secured to the annular base portion 8. The cylinder ring 9 is located within an annular space delimited by the outer wall 10 of the chamber 5, which is concentric with a cylinder ring 11, and an annular plate 12 welded to the tops of the outer wall 10 and the cylinder ring 11. The outer wall 10 of the chamber 5 is slidably mounted in the central opening of the annular plate 6b.

Figures 1, 2:
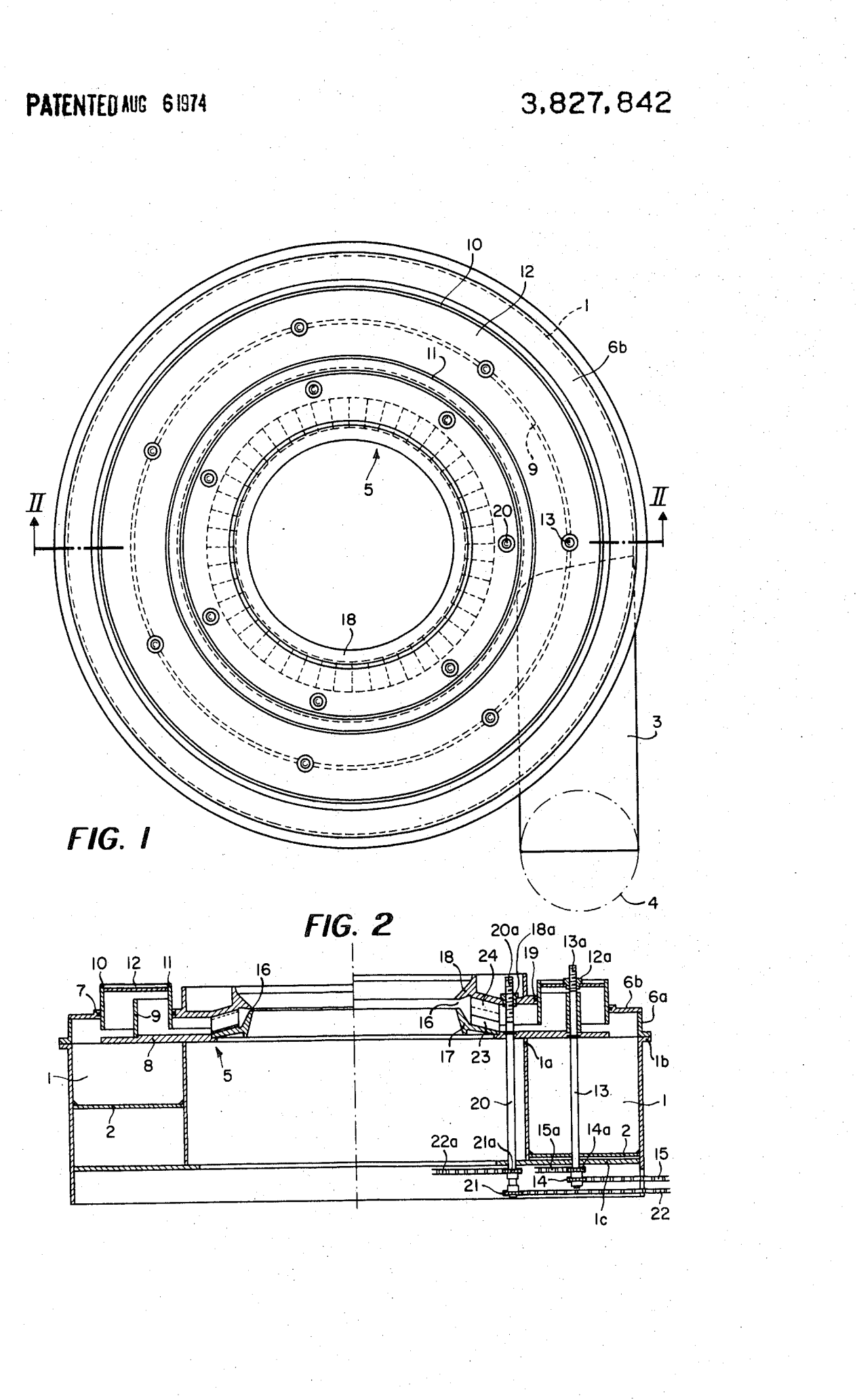

A plurality of rods 13 extend parallel to the axis of rotation of the chamber 5 and are distributed angularly at regular intervals around this axis of rotation. Only one of the rods 13 is shown in FIG. 2. The rods 13 are rotatably mounted with one end thereof in the base portion 1c of the spiral tank 1 and with the other end in the annular base portion 8 of the chamber 5. The portion of the rods 13 which projects above the annular base portion 8 is provided with a screw thread 13a which engages a corresponding screw thread in a nut 12a mounted in an opening of the annular plate 12.

The rods 13 serve to control the axial position of the portion of the chamber 5 formed by the outer wall 10, the ring 11 and the annular plate 12. For this purpose the lower ends of the rods 13 which project below the spiral tank 1 carry sprocket wheels 14 and 14a. The sprocket wheel 14 engages a chain 15 which connects the rod 13 to manual or mechanical control means (not shown). The sprocket wheel 14a engages a chain 15a which connects the rods 13 to one another.

By rotating the rods 13 the clearance between the lower edges of the wall 10 and the ring 11 and the top of the annular base portion 8 and between the upper edge of the ring 9 and the bottom of the annular plate 12 can be varied. The purpose of this variation will be explained hereafter. The gap between the lower edge of the outer wall 10 and the top of the annular base portion 8 forms an annular communication slot between the spiral tank 1 and the chamber 5.

The outlet of the chamber 5 is formed by an annular slot 16 which connects the inside of the chamber 5 to the central opening thereof through which the extruded tubing is to pass. The lower lip of the outlet slot 16 is formed by a first annular member 17 concentrically mounted on the inner edge of the annular base portion 8. The upper lip of the outlet slot 16 is formed by a second annular member 18 mounted for sliding movement in the cylinder ring 11. A gasket 19 provides for sealing between the cylinder ring 11 and the annular member 18.

A plurality of rods 20 are arranged parallel to the axis of rotation of the chamber 5 at regular angular intervals around this axis. Only one of the rods 20 is shown in FIG. 2. The rods 20 are rotatably mounted with one end thereof in the base portion 1c of the spiral tank 1 and with the other end in the annular base portion 8 of the chamber 5. Each of the rods 20 has a threaded end 20a projecting above the base portion 8 and screwing in a nut 18a secured to the second annular member 18.

The lower end of the rod 20 likewise projects below the base plate 1c of the spiral tank 1 and carries sprocket wheels 21 and 21a. The sprocket wheel 21 engages a chain 22 which connects the rod 20 to a manual or mechanical control device (not shown) which is independent from the control device of the rods 13. The sprocket wheel 21a engages a chain 22a which connects the rods 20 to one another.

This particular arrangement permits the axial position of the second annular member 18 to be varied by angular movement of the rod 20 and consequently the width of the annular outlet slot 16 can be adjusted. The purpose of this adjustment will be explained thereafter.

Each of the two annular members 17 and 18 forming the lips delimiting the annular outlet slot 16 carries radial blades 23 and 24, respectively, spaced at regular intervals around the axis of rotation of the chamber 5. Each blade 23 of the annular member 17 has a corresponding blade 24 on the annular member 18, one of the radial surfaces of each blade 24 being constantly in contact with one of the radial surfaces of the adjacent blade 23.

During operation of the cooling device described above, air is blown by the fan 4 through the air supply conduit 3 into the helical passage formed by the partition 2 in the interior of the spiral tank 1. The air is distributed in this helical passage and fed into the chamber 5 through the annular opening defined between the lower edge of the outer wall 10 and the annular base portion 8.

The cylinder rings or walls 9 and 11 located in the interior of the chamber 5 act as baffle plates forming an obstacle (axially tortuous path) in the flow path of the air between the annular inlet slot or zone of the chamber 5 and the annular outlet slot or zone 16 through which the air is blown against the tubing passing through the central opening in the chamber 5. The purpose of this obstacle is to uniformly distribute the pressure of the air leaving the chamber 5 through the slot 16 and to impart to the air a substantially radial direction of flow. The purpose of the blades 23 and 24 is to improve the radial direction of the air which is blown against the tubing passing through the central opening of the chamber 5, The amount of air flow through the chamber 5 is adjustable by varying the cross section of the annular passage in the chamber 5. This adjustment is obtained by angular movement of the rods 13 in the desired direction by means of the chains 15 and 15a so as to shift the outer wall 10 and the cylinder ring 11 between the annular plate 6b and the annular member 18 forming the upper lip of the annular outlet slot 16.

By adjusting the width of the gap between the lips of the annular outlet slot 16 by means of the rods 20 the flow speed of the air can be varied. The more the lips of the annular outlet slot 16 are moved apart the more the air discharge speed is reduced.

The adjustment of the air flow speed together with the adjustment of the amount of air flow permits adaptation of the cooling device described above to extrusion of tubing of different diameters and to different flows. In fact, it is essential that the amount of flow and the speed of the air blown against the tubing should be adapted to the strength of the tubing passing through the central opening of the chamber 5. As mentioned above, the plastic material of the tubing to be cooled is in the molten state and it is therefore important that the air blown against the tubing should not split it. Therefore, the speed at which the air is blown against the tubing at the outlet of the nozzle must be lower for large diameter tubing whose outer wall is closer to the annular slot 16 of the nozzle, than for tubing having a small diameter.

The cooling device according to the invention affords the advantage of blowing a jet of cooling air radially against the tubing with a pressure remaining uniform over the entire circumference of the tubing. This result is obtained simply by feeding air under pressure against the tubing through a spiral tank provided with annular baffle plates at the outlet of the tank. Further, the described adjusting means permit the amount and speed of air flow to be adapted to all types of tubing capable of passing through the central opening in the annular chamber 5. This adaptation of the device is effected rapidly without dismantling or exchanging any part thereof and imparts to the device a great flexibility of use without niticeably increasing its cost.

Although a preferred embodiment of the invention has been described herein in detail with reference to the accompanying drawing it is to be understood that the invention is not limited to this precise embodiment and that numerous changes and modifications may be made therein without departing from the scope of the invention.

We claim:

1. A device for cooling plastic tubing extruded from a die along an axis, said device comprising:

an annular scroll-shaped tank surrounding said tubing ahead of said die and formed with an inlet at one axial end, an annular outlet at the opposite axial end remote from said die, and means defining a helical flow path for a cooling fluid from said inlet to said outlet;

means connected to said tank for feeding said cooling fluid to said inlet;

an annular chamber formed on said other axial end of said tank and having an annular inlet slot along an annular inlet slot along an annular outer zone of the chamber in communication with said outlet of said tank;

means defining an annular inwardly directed nozzle communicating with an inner annular zone of said chamber for directing said cooling fluid radially against said tubing; and at least two coaxial cylindrical rings in said chamber between said zones, said cylindrical rings being centered on said axis and disposed in axially overlapping and peripherally spaced relation to define an axially tortuous path for said fluid between said zones.

2. The device defined in claim 1 wherein:

said nozzle comprises a pair of axially spaced members defining a circumferential slot-like orifice for said fluid, a respective radial vane on each of said members reaching toward the other of said members and subdividing said nozzle into radial passages, and means for relatively displacing said members to vary the width of said orifice;

said chamber comprises a pair of axially spaced annular plates, each of said rings being affixed to a respective one of said plates and reaching toward but terminating short of the other of said plates; and said device further comprises means for relatively axially displacing said plates to vary the flow cross-section of said tortuous path.

* * * * *